United States Patent [19]

Lanigan

[11] 3,878,463

[45] Apr. 15, 1975

[54] AUTOMATIC CHANNEL SWITCHING SYSTEM

[75] Inventor: Frederick Harold Lanigan, Lowell, Mass.

[73] Assignee: Bell Telephone Laboratories, Incorporated, Murray Hill, N.J.

[22] Filed: June 6, 1973

[21] Appl. No.: 367,482

[52] U.S. Cl. .................... 325/2; 325/2; 340/147 SC

[51] Int. Cl. ............................................ H04b 3/00

[58] Field of Search ......... 325/2, 67, 133, 150, 363, 325/364; 179/15 BF, 170 A, 170 F; 178/71 T; 333/2, 3, 15, 16; 340/147 SC

[56] References Cited

UNITED STATES PATENTS 3,681,694 8/1972 Sarati ..................................... 325/2

*Primary Examiner*—George H. Libman

*Attorney, Agent, or Firm*—John J. Torrente; Harry L. Newman

[57] ABSTRACT

An automatic protection switching system whose switching action is primarily controlled by a logic control circuit which has sections corresponding to the regular and protection channels of the system and which includes a protection network associated with each of the protection channels. Each of the aforesaid protection networks functions to sequentially enable the regular channel sections of the control circuit so that such sections can order or assign their respective regular channels to the protection channel associated with the protection network. Each of the protection networks, moreover provides such a result via a chain of circuit segments connected in a loop with the segments distributed amongst the regular channel sections and the protection channel section associated with the particular protection network.

22 Claims, 9 Drawing Figures

AUTOMATIC CHANNEL SWITCHING SYSTEM

BACKGROUND OF THE INVENTION

This invention relates to automatic protection switching systems and more particularly to automatic protection switching systems which can be easily and inexpensively enlarged in an orderly fashion with a minimum of system modification.

The reliability required of a present day radio relay system carrying various forms of information dictates that such a system be provided with some means for protecting against the failure of one or more of its regular working channels due to fading and equipment malfunctions. In general, protection against such failures has been provided for by further including in the radio relay system one or more protection channels and an automatic switching system for enabling the service on a failed regular channel to be automatically switched to one of the added protection channels. Prior art radio relay systems making use of such automatic protection switching system arrangements are well known in the art and have been described, for example, in U.S. Pat. Nos. 2,733,296 and 3,111,624 issued respectively to J. Maggio on Jan. 31, 1956 and F. Farkas on Nov. 19, 1963 and in an article by Griffiths and Medelka entitled "100-A Protection Switching System" published in the *Bell System Technical Journal* for December 1965 on pages 2295–2336.

Typically, the above-mentioned prior art radio relay systems are divided up into a number of similarly equipped switching sections, each of which possess the capability of providing channel switching operation. More particularly, a typical switching section might include a transmitter terminal, a receiver terminal, a plurality of regular channels linking the terminals through intermediate repeater terminals, one or more protection channels linking the terminals, and an automatic switching system comprising means for substituting a protection channel for a regular channel upon the failure of the regular channel.

The automatic switching system of such a switching section usually has associated equipment at both the transmitter and receiver terminals. As a result, the switching section is usually also provided with an auxiliary signaling facility separate from the switching system which enables information to be transmitted from the switching system equipment located at the switching section receiver terminal to the switching system equipment located at the switching section transmitter terminal.

The particular type of automatic switching system equipment allocated to each of the aforesaid transmitter and receiver terminals of a switching section will usually be determined by which location is required to exercise major control over operation of the switching system. For the purposes of present discussion, the receiver terminal will be assumed to exercise such control. The automatic switching system equipment allocated to the latter terminal will thus be found to include regular channel monitors for monitoring the transmission of the regular channels, protection channel monitors for performing the aforesaid monitoring function for the protection channels, an interchannel matrix which is responsive to both the regular channel and protection channel monitor outputs and which serves as the primary control circuit for the switching system, a receiver switch which is controlled by the interchannel matrix and through which the regular channels and protection channels are channeled, and a receiver terminal signaling facility for conveying signals from the interchannel matrix to the auxiliary channel. At the transmitter terminal, on the other hand, the switching system equipment allocated thereto will typically comprise a transmitter switch through which the protection and regular channels are transmitted, a transmitter control circuit which controls operation of the transmitter switch in response to signals from the interchannel matrix and a transmitter signaling facility which conveys signals from the auxiliary channel to the transmitter control circuit.

As indicated hereinabove, the automatic switching system of a switching section provides substitution of a protection channel for a regular channel when the regular channel fails. Such a failure might result from a loss of carrier on the channel or from a decrease in signal to noise level on the channel below a predetermined level. In either case, the failure of the regular channel is first detected by the regular channel monitor associated with the channel located at the receiver terminal. The regular channel monitor, having recognized the failure of its associated regular channel, then transmits a request to the interchannel matrix to initiate action to effect a switch of the failed regular channel to one of the protection channels. Upon receipt of the monitor request signal, the matrix first ascertains whether any of the protection channels is available, i.e, whether there is one protection channel which has not itself failed or which is not already busy substituting for another regular channel which has priorly failed. If a protection channel is available, the interchannel matrix then makes an assignment of the regular channel to that protection channel. At the same time, the matrix signals its associated signaling circuitry to transmit over the auxiliary facility an instruction to the transmitter control switch to effect a bridging switch at the transmitter terminal of the failed regular channel to the assigned protection channel. This instruction is received by the transmitter signaling facility and conveyed to the transmitter switch control. The latter then informs the transmitter switch to make the appropriate bridging switch to the assigned protection channel.

Simultaneously therewith, the transmitter switch control initiates action to inform the interchannel matrix of the completed bridging switch. Typically, such action might take the form of ordering the transmitter switch to remove from the assigned protection channel a pilot signal which was being transmitted over the protection channel during the latter's idle state. Assuming for present purposes that this is the case, such removal of the pilot signal from the protection channel is detected at the receiver terminal by the protection channel monitor corresponding to the assigned protection channel. The aforesaid monitor conveys such information to the interchannel matrix which recognizes it as verification that the appropriate switching action at the transmitter has been carried out.

The switch at the transmitter having been verified, the interchannel matrix then signals the receiver switch to effect a switch of the designated protection channel to the failed regular channel and the switching action is therefore completed.

As is clearly evidenced from the above, the interchannel matrix of the protection switching system performs numerous functions in order to effect substitution of a protection channel for a failed regular channel. To carry out such functions, the matrix must necessarily comprise a complicated arrangement of interconnected logic sections. In a typical case, the matrix includes regular channel logic sections which are associated with the regular channels and protection channel logic sections which are associated with the protection channels. Also included in the matrix are interconnecting paths for providing interconnection of each of aforesaid logic sections with every other logic section. Such paths are required to enable signaling between the sections so as to prevent improper substitution of a protection channel for a failed regular channel. In particular, the only time it is desirable to substitute a protection channel for a failed regular channel is when the protection channel is not busy or in a failed condition. Thus, when an interchannel matrix regular channel logic section assigns its associated regular channel to a given protection channel, the latter regular channel logic section must signal all the other regular channel sections over their respective interconnecting paths of such assignment so as to inhibit any further assignments to the already assigned protection channel. Similarly, if a given protection channel fails, its corresponding logic section of the interchannel matrix must signal all the regular channel logic sections via their interconnecting paths of such failure so as to inhibit assignment to the failed protection channel.

Due to the above-mentioned necessity of having to provide interconnecting paths between the logic sections of the interchannel matrix of the aforesaid automatic protection switching system, it can be readily understood that once the matrix is designed for a given number of regular and protection channels, it becomes extremely difficult and costly to alter the matrix to provide operation for a lesser or greater number of regular channels. As a result, it would be highly beneficial if control apparatus could be provided for such an automatic protection switching system which is arranged to substantially eliminate the necessity of having to have large numbers of interconnections between logic sections and which, as a result, can be easily and inexpensively modified so as to provide operation for a lesser or greater number of channels. It is the primary objective of the present invention to provide such control apparatus.

SUMMARY OF THE INVENTION

In accordance with the principles of the present invention, the above and other objectives are accomplished by employing control apparatus for an automatic switching system which includes regular channel control sections and at least one protection channel control section, each section being arranged on a per channel basis, and which includes, in addition, a protection network associated with the protection channel, said protection network comprising a sequential pulsing circuit having serially connected segments which are arranged in a closed loop and which are distributed amongst the regular channel and protection channel control sections for sequentially enabling each of former sections.

More particularly, the pulsing circuit of the protection network is activated by a pulsing circuit activating signal which is generated when one of the regular channels fails and which is used to activate the pulsing circuit segment included in the protection channel control section. Once activated, an enabling pulse starts circulating in sequence through the segments of the pulsing circuit associated with the regular and protection channel control sections. Only when the enabling pulse is present in the segment of a particular regular channel control section is that section able to effect a switch of its regular channel to the protection channel. The enabling pulse thus sequentially circulates through the pulsing circuit segments until it arrives at the regular channel control section whose regular channel is being reported as failed. Once enabled by the pulse, the latter control section assigns its regular channel to the protection channel and the switching process is initiated.

Simultaneously with such assignment, the regular channel section also generates a stop signal which stops the enabling pulse from proceeding to the next successive pulsing circuit segment in the loop. Other regular channels which subsequently fail are thus prevented from being switched to the assigned protection channel because of the inability of the enabling pulse to reach their pulsing circuits segments. Interconnecting paths between the control sections previously needed to realize such a result are thus no longer needed. Additionally, since the control sections are arranged on a per channel basis, an additional channel and corresponding control section can be easily and inexpensively added by merely breaking the serial connection of pulsing circuit segments and inserting an additional segment for the added channel and control section.

If more than one protection channel is to be employed, then each additional protection channel requires an additional associated sequential pulsing circuit. Signaling between the pulsing circuits can then be used to activate one of the other pulsing circuits when a channel is seeking an assignment to a protection channel already in use.

In the particular embodiments disclosed herein, the sequential pulsing circuit comprises a chain of binary elements arranged in a closed loop to form a ring counter, with a segment of the loop associated respectively with each regular channel control section and each protection channel control section.

DESCRIPTION OF THE DRAWING

The above and other features and aspects of the present invention will become more apparent upon consideration of the following detailed description taken in conjunction with the following drawings in which.

DETAILED DESCRIPTION

Figure 1:
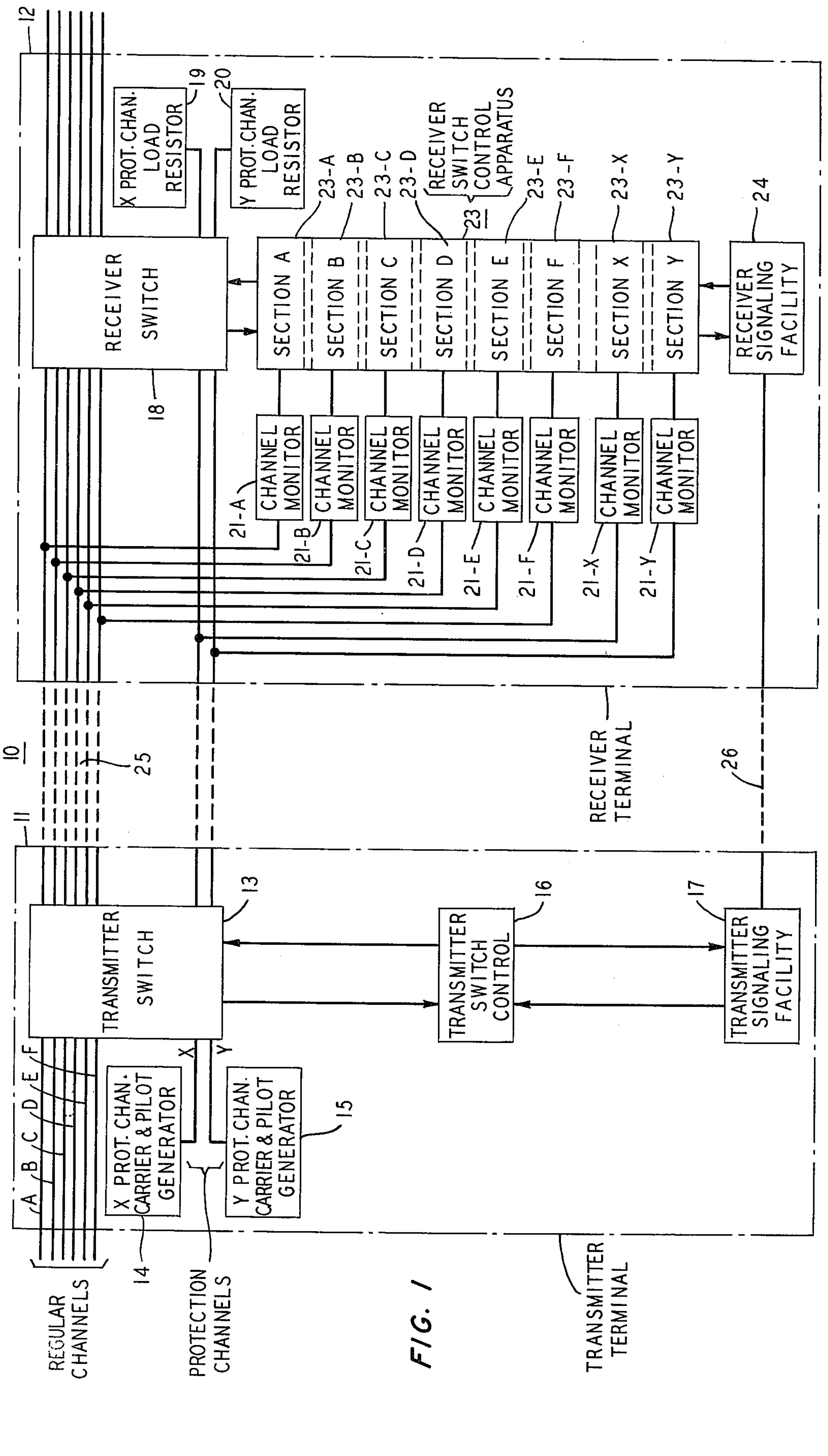
FIG. 1 shows a switching section of a radio relay system which includes an automatic protection switching system comprising control apparatus in accordance with the principles of the present invention.

FIG. 1 shows a switching section 10 which might be illustrative of one of several switching sections comprising a typical radio relay system. As illustrated, switching section 10 comprises a transmitter terminal 11 and a receiver terminal 12. Linking terminals 11 and 12 are one or more regular transmission channels which are illustratively depicted as regular channels A, B, C, D, E and F. Also linking the two terminals are two other transmission channels which provide protection against failure of any of the aforesaid regular channels. These other channels are designated as protection channels X and Y.

Also included in the switching section is an automatic switching system for switching the service on any one of the regular channels to one or the other of the protection channels upon failure of a regular channel. The aforesaid switching system comprises equipment located at both the transmitter and receiver terminals. In particular, the associated equipment at the transmitter terminal comprising the automatic switching system includes a transmitter switch 13, X and Y protection channel carrier and pilot signal generators 14 and 15, a transmitter switch control 16 and a transmitter signaling facility 17. At the receiver terminal, on the other hand, the equipment associated with the automatic switching system comprises a receiver switch 18, X and Y protection channel load resistors 19 and 20, channel monitors 21, a receiver switch control apparatus 23 and a receiver signaling facility 24.

As indicated hereinabove, the terminals 11 and 12 of the switching section are linked by the regular channels A to F. These channels may either have originated in the switching section itself or may have entered the section through suitable receivers included therein after transmission from another switching section. In any case, in the transmitter terminal 11, the regular channels are channeled or directed through transmitter switch 13 along with the protection channels X and Y, the latter channels having first been supplied with carrier signals and pilot signals via signal generators 14 and 15. The switching action of transmitter switch 13 is controlled by transmitter switch control 16 which, in turn, is responsive to signals from a transmitter signaling facility 17. The operation of switch 13, control 16 and signaling facility 17 will be left for further discussion hereinbelow.

After passage through transmitter switch 13, regular channels A to F and protection channels X and Y pass through suitable radio transmitters (not shown) at terminal 11 and are then conveyed over a radio path 25 to the receiver terminal 12. At the receiver, the channels are directed through conventional radio receivers (not shown) and all passed therefrom to receiver switch 18. After passage through receiver switch 18, the regular channels are conveyed to suitable utilization devices (not shown) or retransmitted, while the X and Y protection channels are coupled respectively to load resistors 19 and 20, each of which acts to absorb the carrier and pilot signal power on its respective channel, during the channel's idle state.

In addition to passage into the receiver switch 18, each of the regular channels and each of the protection channels is coupled to a channel monitor. In particular, regular channels A to F are coupled to regular channel monitors 21—A to 21—F, respectively, while protection channels X and Y are coupled to protection channel monitors 21—X and 21—Y. The outputs from channel monitors 21—A to 21—F, in turn, serve as inputs to sections 23—A to 23—F, respectively, of receiver switch control apparatus 23. Additionally, apparatus 23 is fed the output from protection channel monitors 21—X and 21—Y, this output being applied to sections 23—X and 23—Y of the apparatus.

Receiver control apparatus 23 develops an output signal which is applied to receiver switch 18 for effecting control over the switching action of this switch. Apparatus 23 additionally develops another output signal which is employed to initiate switching action of transmitter switch 13. This latter signal is coupled to receiver signaling facility 24 for transmission to the transmitter signaling facility 17 over an auxiliary signaling facility 26 which is separate from the switching system.

As indicated hereinabove, the transmitter switch 13, signal generators 14 and 15, transmitter switch control 16, transmitting signaling facility 17 in combination with the receiver switch 18, load resistors 19 and 20, channel monitors 21, receiver switch control apparatus 23, and receiving signaling facility 24 form the automatic switching system of the switching section 10. The automatic switching action effected by the switching system is controlled primarily by the receiver switch control apparatus 23 which, in accordance with the principles of the present invention, includes an X sequential pulsing circuit (XSPC) network which functions to enable substitution of the X protection channel for a failed regular channel and a Y sequential pulsing circuit (YSPC) network which functions to enable the substitution of the Y protection channel for such a failed regular channel.

Figure 2A:
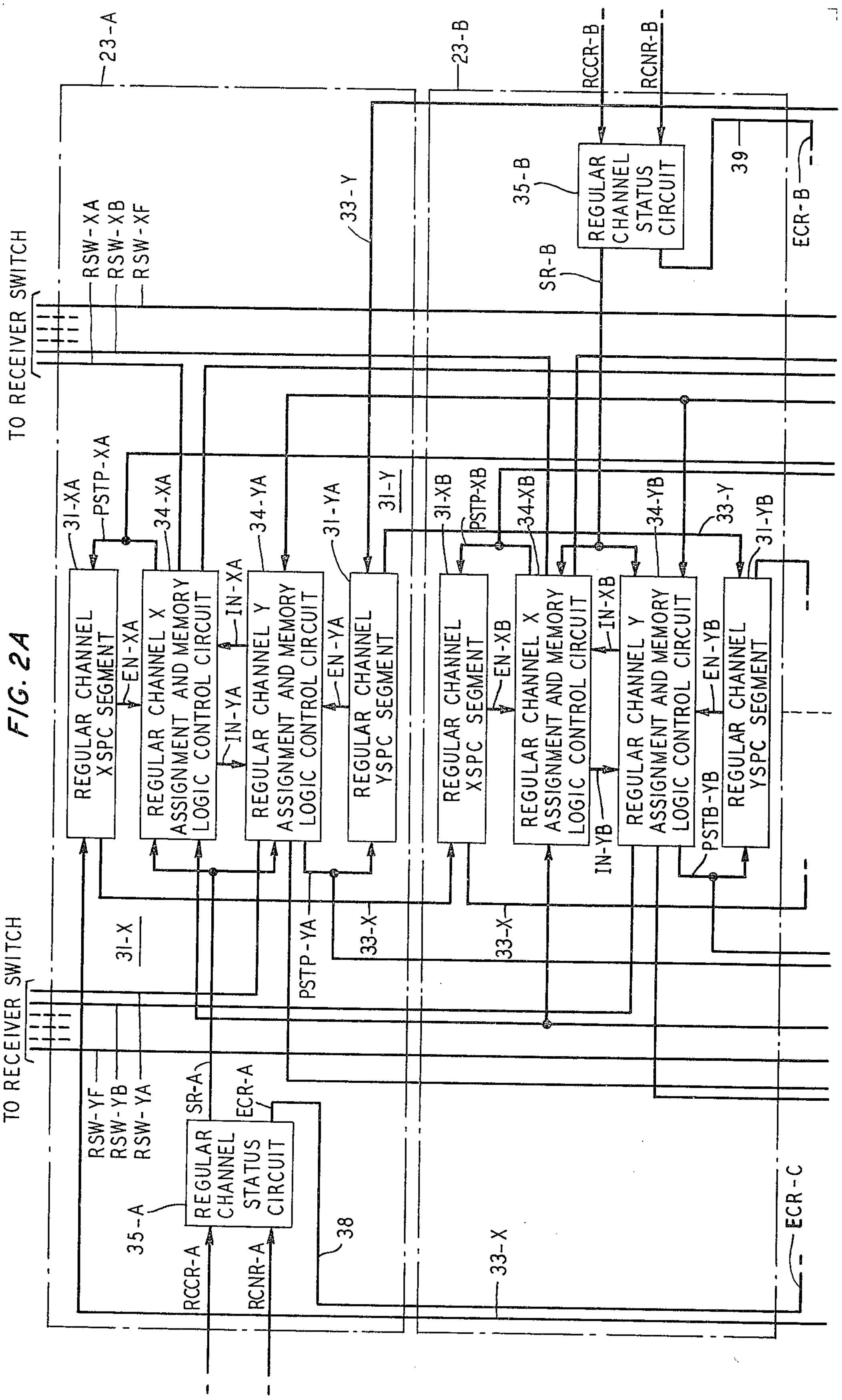
FIGS. 2A, 2B and 2C show the control apparatus of the switching section of FIG. 1 in more detail.
Figure 2B:
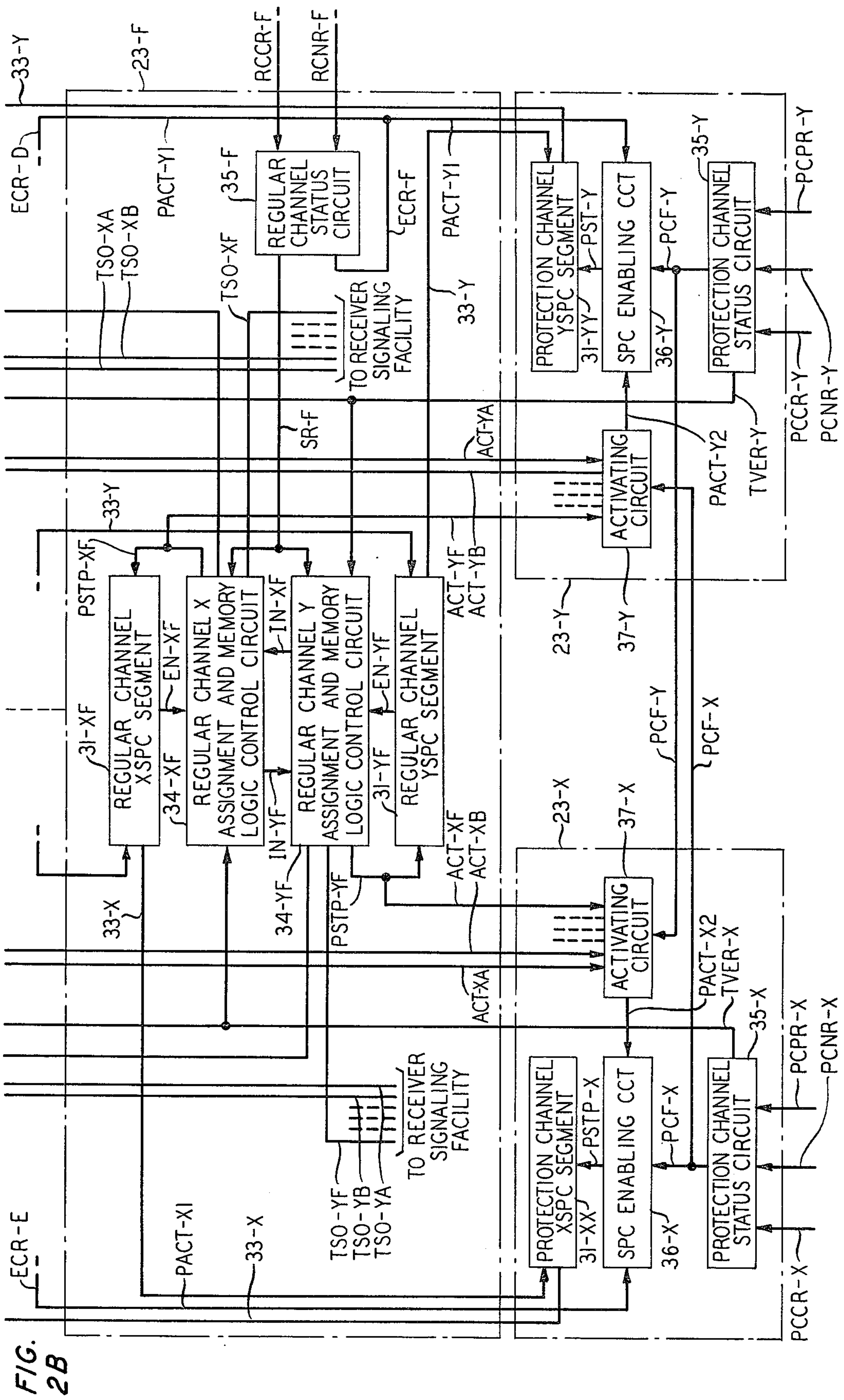
Figures 2C, 3:
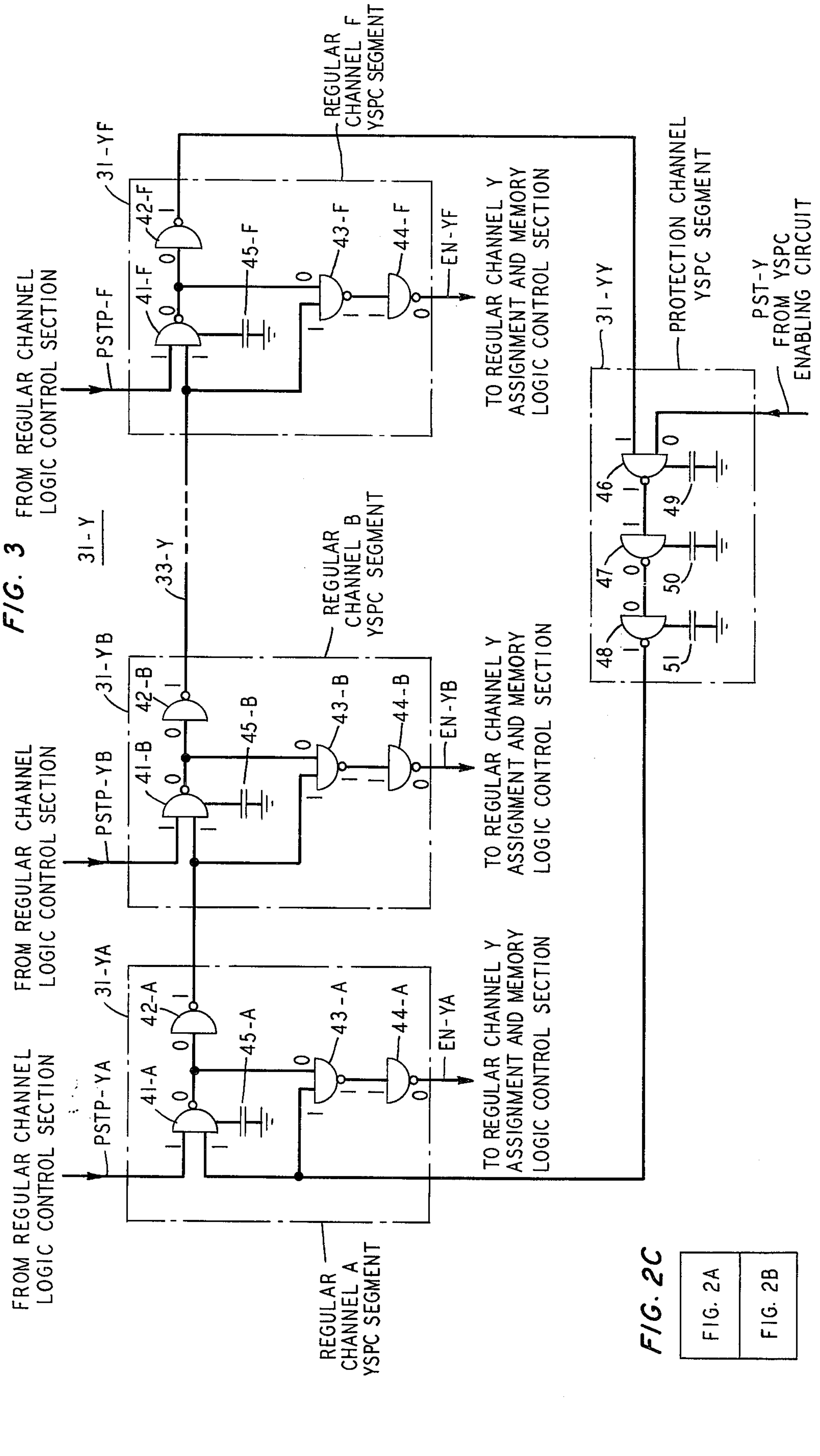
FIG. 3 shows a typical logic configuration for the sequential pulsing circuits of the aforesaid control apparatus.

More particularly, FIGS. 2A, 2B and 2C illustrate the regular channel sections 23—A to 23—F and protection channel sections 23—X and 23—Y of apparatus 23 in greater detail. As above indicated, in accord with the principles of the present invention, each of the sections includes a segment of an XSPC network 31—X and a segment of a YSPC network 31—Y. In particular, regular channel XSPC segments 31—XA to 31—XF, and regular channel YSPC segments 31—YA to 31—YF are included in the respective regular channel sections 23—A to 23—F and protection channel XSPC segment 31—XX and protection channel YSPC segment 31—YY are included in protection channel sections 23—X and 23—Y, respectively.

The segments of each of the aforesaid SPC networks are connected in series from section to section to form a closed loop or path, the XSPC segments forming the loop 33—X and the YSPC segments the loop 33—Y. The use of SPC networks 31—X and 31—Y in apparatus 23 hence only requires that each of the sections 23—A to 23—F have, one connection to a prior section and one connection to a subsequent section. Employment of the SPC networks thus avoids the necessity of having to connect each section to every other section as was the case in prior structure.

In addition to segments of SPC networks 31—X and 31—Y, each of the regular channel sections 23—A to 23—F further includes an X assignment and memory logic control circuit associated with its XSPC segment, a Y assignment and memory logic control circuit associated with its YSPC segment, and a status circuit.

More specifically, regular channel X logic control circuits 34—XA to 34—XF, regular channel Y logic control circuits 34—YA to 34—YF and regular channel status circuits 35—A to 35—F are included in regular channel sections 23—A to 23—F, respectively. Each of the protection channel sections 23—X and 23—Y, on the other hand, in addition to its SPC segment, also includes a protection chanel status circuit, an SPC enabling circuit and an activating circuit. In particular, sections 23—X and 23—Y include, respectively, status circuits 35—X and 35—Y, SPC enabling circuits 36—X and 36—Y and activating circuits 37—X and 37—Y.

Each of the regular channel logic control circuits included in a particular section is responsive to a logic signal from the status circuit associated with the section. Thus, switch request logic signals SR—A to SR—F are fed from the status circuits 35—A to 35—F to the control circuits 34—XA to 34—XF, respectively, and to the control circuits 34—YA to 34—YF, respectively. The aforesaid switch request signals are developed by the status circuits as a result of logic signals applied thereto from the channel monitors. Each status circuit is fed two signals from its associated monitor, one being a regular channel carrier report logic signal RCCR and the other a regular channel noise report logic signal RCNR. More particularly, the carrier report signals feeding the status circuits 35—A to 35—F have been designated as RCCR—A to RCCR—F, while the noise report signals feeding these circuits as RCNR—A to RCNR—F.

In addition to a switch request signal, each of the regular channel assignment and memory logic control circuits is also responsive to logic signals from its associated regular channel SPC segment, from its associated protection channel status circuit, and from the other logic control circuit included in its respective section. In particular, circuits 34—XA to 34—XF receive enabling to logic signals EN—XA to EN—XF, respectively, from the XSPC segments 31—XA to 31—XF, a transmitter verification signal TVER—X from the protection channel status circuit 35—X, and inhibit signals IN—XA to IN—XF, respectively, from logic circuits 34—YA to 34—YF. Circuits 34—YA to 34—YF, in turn, receive enabling logic signals EN—YA to EN—YF, respectively, from YSPC segments 31—YA to 31—YF, a transmitter verification signal TVER—Y from the protection channel status circuit 35—Y and inhibit signals IN—YA to IN—YF, respectively, from circuits 34—XA to 34—XF.

Each of the regular channel assignment and memory logic control circuits, moreover, in addition to transmitting a signal to the other logic circuit included in its respective section, also transmits logic signals to its respective SPC segment, to one of the activating circuits, to the receiver switch and to the receiver signaling facility. The logic signals transmitted by control circuits 34—XA to 34—XF to the regular channel XSPC segments are designated as XSPC stop signals PSTP—XA to PSTP—XF, those to activating circuit 37—Y as activating signals ACT—YA to ACT—YF, those to the receiver as receiver switch signals RSW—XA to RSW—XF, and finally, those to the signaling facility as transmitter switch order signals TSO—XA to TSO—XF. In turn, the logic signals transmitted by control circuits 34—YA to 34—YF to the regular channel YSPC segments are designated as YSPC stop signals PSTP—YA to PSTP—YF, those to activating circuit 37—X as activating signals ACT—XA to ACT—XF, those to the receiver switch as receiver switch signals RSW—YA to RSW—YF and those to the signaling facility as transmitter switch order signals TSO—YA to TSO—YF.

The protection channel status circuit 35—X, on the other hand, in addition to transmitting the logic signal TVER—X to its associated logic circuits 34—XA to 34—XF, also transmits an X protection channel failure logic signal PCF—X to activating circuit 37—Y and enabling circuit 36—X. Such signals are developed by status circuit 35—X in response to three logic signals designated as X protection channel carrier report logic signal PCCR—X, X protection channel noise report signal PCNR—X, and X protection channel pilot report logic signal PCPR—X which are received by the circuit from its respective channel monitor 21—X.

In addition to the signal PCF—X from status circuit 35—X, enabling circuit 36—X also receives activating signals PACT—X1 and PACT—X2, the latter from activating circuit 37—X and the former from common bus 38, which is fed enabling circuit request signals ECR—A, ECR—C, and ECR—E from status circuits 35—A, 35—C and 35—E. In response to these signals, circuit 36—X develops an XSPC network start signal PST—X, which is applied to XSPC segment 31—XX.

Protection channel status circuit 35—Y, like status circuit 35—X, is also responsive to a protection channel carrier report logic signal PCCR—Y, a protection channel noise report signal PCNR—Y, and a protection channel pilot report signal PCPR—Y, all of which signals are developed by the respective channel monitor 21—Y. As above-noted, circuit 35—Y responds to the signal PCPR—Y by transmitting the verification signal TVER—Y to the circuits 34—YA to 34—YF. Additionally, it responds to the signals PCCR and PCNR by transmitting a Y protection channel failure logic signal PCF—Y to activating circuit 37—X and enabling circuit 36—Y.

In addition to receiving signal PCF—Y, enabling circuit 36—Y also receives two activating signals PACT—Y1 and PACT—Y2, the latter from activating circuit 37—Y and the former from common bus 39, which is fed enabling circuit request signals ECR—B, ECR—D, and ECR—F from status circuits 35—B, 35—D, and 35—F. In response thereto, the enabling circuit develops a YSPC network start signal PST—Y, which is applied to YSPC segment 31—YY.

OPERATION

Having briefly outlined the various logic signals being received and transmitted by the various components included in receiver switch control apparatus 23, a more detailed discussion of the operation of the apparatus will now be presented with reference being made to the aforesaid signals and to FIGS. 1 and 2. More particularly, as indicated hereinabove, the regular channels A to F of the radio system after entering receiver terminal 12 are monitored by regular channel monitors 21—A to 21—F respectively. Each of these monitors performs in a conventional manner, the function of detecting the carrier amplitude or power and signal-to-noise ratio of the signal on its corresponding channel. Having done so, each monitor then reports the condition of each of these parameters to its associated section of control apparatus 23 via the regular channel carrier report signal RCCR and regular channel noise report signal RCNR. Under circumstances where none of the regular channels has failed, i.e., all have carriers and signal-to-noise ratios at suitable levels, all the signals RCCR—A to RCCR—F and all the signals RCNR—A to RCNR—F developed by the monitors will be assumed to be at a O logic level. Failure of a channel as to carrier or signal-to-noise ratio will then be reported by a particular monitor by a change of the logic level of its respective RCCR or RCNR signal from a 0 to a 1. For the present, it will be assumed that none of the regular channels has failed and thus that the signals RCCR and the signals RCNR are at a O level.

In the receiver switch control apparatus 23, the two logic signals developed by each channel monitor are received by the section of the apparatus associated with the monitor and, in particular, by the status circuit 35 included in the particular section. In response to such signals, each status circuit develops a switch request logic signal SR and a corresponding enabling circuit request logic signal ECR. The signals SR and ECR developed by each status circuit will be assumed herein to be at a O logic level if a switch of their respective channel is desired. Such would be the situation if either their respective monitor signal RCCR is at a 1 indicating an unacceptable carrier level or if their respective monitor signal RCNR is at a 1 indicating an unacceptable signal-to-noise ratio. If a switch is not desired, i.e., both the signals RCCR and RCNR are at a O level indicating acceptable carrier and signal noise ratio levels, then the SR and ECR signals developed will be at a 1 level. Since, in the present case, all the signals from the monitors are at a O level, the signals SR—A to SR—F and the signals ECR—A to ECR—F developed by status circuits 35—A to 35—F, respectively, will all be at a 1 level.

Each of the switch request signals SR—A to SR—F developed by status circuits 35 serves as an input to both the X and Y assignment and memory logic control circuits 34 included in its respective section of apparatus 23. The X and Y assignment and memory logic control circuits of each of the sections, in turn, provide the major control for switching the service on their respective regular channel to the X and Y protection channels, respectively, the latter switching action being requested by way of their associated switch request signal being at a O logic level. As will become clear from the discussion hereinbelow, however, each of the X and Y control circuits of a particular section will be unable to execute such switching action in the face of a request to switch signal (i.e., SR at O) unless appropriately enabled by its associated SPC segment 31.

In the present circumstances, since all of the switch request signals SR—A to SR—F are at a 1 level, no request to switch is being made on the X and Y control circuits of any section. Under such conditions, the output signals developed by these circuits will be as follows: the pulse stop signals PSTP—X and PSTP—Y will be at a 1 logic level, indicating a no-stop condition to their respective pulsing circuits; the receiver switch signals RSW—X and RSW—Y and the switch order signals TSO—X and TSO—Y will be held at a 1 logic level, indicating, respectively, no receiver switch action is to be taken and no signals are to be communicated to the transmitter switch; the activating signals ACT—X and ACT—Y will also be at 1 logic levels, indicating to their respective activating circuits not to activate their associated enabling circuits; and the inhibit signals IN—X and IN—Y will be at 1 logic levels, indicating a no-inhibit condition.

While the switch request signals SR developed by status circuits 35 thus serve as inputs to assignment and memory logic circuits 34, requesting these circuits to initiate or not initiate action, the enabling circuit requests signals ECR developed by status circuits 35 perform a similar function with respect to enabling circuits 36. In particular, each of the signals ECR serves as an input to a particular one of the enabling circuits 36, requesting such circuit to activate or not activate its associated SPC network. As a result, when a switch request signal of a particular status circuit is requesting its associated logic circuits to initiate action, the enabling circuit request signal developed by this status circuit will, likewise, be requesting its respective enabling circuit to activate its associated SPC network. As will be more fully explained hereinbelow, if the enabling circuit is in a condition to act upon such request, the aforesaid SPC network will be activated and will begin sequentially enabling each of its respective assignment and memory logic circuits, via its distributed segments, until it enables the assignment circuit receiving the switch request, thereby permitting such circuit to act thereon.

In the present illustrative example, the enabling circuit signals ECR—A, ECR—C, and ECR—E serve as inputs to the SPC enabling circuit 36—X via the activating signal PACT—X1 on common bus 38. The requests of the latter three signals are thus directed to circuit 36—X which, if it is able to, responds thereto by either activating or not activating the XSPC network 31—X via the PST—X signal applied to XSPC segment 31—XX. Since the aforesaid XSPC network controls the enabling of the X assignment and memory logic circuits 34—X, its activation by enabling circuit 36—X, due to a request by any one of the signals ERC—A, ERC—C, and ERC—E, will result in a switch to the X protection channel. Such a result thus establishes a preference of the regular channels A, C, and E associated with the aforesaid signals to be switched to the X protection channel rather than the Y protection channel, if both are available.

While the enabling signals ERC—A, ERC—C, and ERC—F serve as inputs to enabling circuit 36—X, the other three enabling signals ERC—B, ERC—D, and ERC—E serve as inputs to enabling circuit 36—Y via the activating signal PACT—Y1 on common bus 39. The latter enabling circuit responds to the requests of such signals in a similar manner as circuit 36—X, except that in this instance, it is YSPC network 31—Y which is either activated or not activated via the PST—Y signal applied to YSPC segment 31—YY. Since the YSPC network controls the enabling of Y assignment and memory logic circuits 34—Y, however, its activation by circuit 36—Y will result in a switch to the Y protection channel. Thus, the regular channels B, D and F, associated with the signals ERC—B, ERC—D, and ERC—F, show a preference to be switched to the Y protection channel, rather than the X protection channel, if both are availaable.

Under the present assumptions, however, the signals ERC—A to ERC—F are all at a 1 logic level, indicating no switch of their associated regular channels is desired. Such a condition of these signals causes both the signals PACT—X1 and PACT—Y1 to be at logic levels of 1. The enabling circuits 36—X and 36—Y, in turn, recognize the 1 logic levels on the signals PACT—X1 and PACT—Y1, respectively, as requests not to start their respective SPC networks. Whether or not the circuits 36—X and 36—Y will respond to such requests, however, depends upon the condition of the other signals feeding each of the circuits.

More particularly, in addition to the abovementioned activating signals, each of the enabling circuits 36 receives a protection channel fail signal from its associated protection channel status circuit 35. Thus, circuit 36—X receives the signal PCF—X from X protection channel status circuit 35—X and circuit 36—Y receives the signal PCF—Y from the Y protection channel status circuit 35—Y. Each of the aforesaid PCF signals, in turn, is developed by its respective status circuit in response to a protection channel carrier report signal PCCR and a protection channel signal-to-noise report signal PCNR, both of which signals are fed to the status circuit from the latter's corresponding protection channel monitor.

The signals PCCR and PCNR are the protection channel counterparts of the two signals RCCR and RCNR, fed to each of the regular channel status circuits from their respective regular channel monitors. Hence, if either of the signals PCCR or PCNR indicates the condition of its associated parameter as being unacceptable (i.e., either signal has a 1 level output), then the respective PCF signal will indicate a failure of its corresponding channel via a O logic output signal. Similarly, if both signals are at a O level, then the PCF signal will be a 1 level, indicating no failure of the protection channel. In the present case, the signals PCCR—X, PCNR—X and the signals PCCR—Y and PCNR—Y will all be assumed to be at 0 logic levels. The corresponding PCF—X and PCF—Y signals will thus both be at 1 logic levels, indicating acceptable operation of both protection channels.

Logic levels of 1 on the signals PCF—X and PCF—Y permit the enabling circuits 36—X and 36—Y, respectively, to act in accordance with the requests being made by the above-discussed activating signals PACT—X1 and PACT—Y1, respectively, and also in accordance with the requests being made by the other activating signals PACT—X2 and PACT—Y2, respectively, feeding these circuits. Logic levels of O, however, on PCF—X and PCF—Y disable the enabling circuits and prevent them from responding to requests being made by their respective activating signals. Since, under the present assumptions, however, PCF—X and PCF—Y are at 1 logic levels, the former case pertains and circuit 36—X can respond to requests by signals PACT—X1 and PACT—X2 and circuit 36—Y can respond to requests by signals PACT—Y1 and PACT—Y2.

As between the two activating signals feeding each enabling circuit 36, if either one is requesting the circuit to activate its respective SPC network, then the SPC network will be activated. The signals PACT—X2 and PACT—Y2 will request such activation, however, only when one of input signals to their respective activating circuits (i.e., circuits 37—X and 37—Y) is at a O logic level. Such request, if made, will be manifested by a 1 logic level for each of the signals PACT—X2 and PACT—Y2. Otherwise, each signal will be at a O logic level, indicating no activation is requested. Under the present assumptions, the signals ACT—XA to ACT—XF and the signal PCF—Y are all at 1 logic levels, thus causing activating circuit 37—X to generate a PACT—X2 at a O level. Similarly, the signals ACT—YA to ACT—YF and the signal PCF—X, feeding activating circuit 37—Y, are all at 1 logic levels, thus causing this circuit to generate a PACT—Y2 signal at a O level.

Appearing at enabling circuit 36—X, therefore, will be a 1 level PACT—X1 signal and a O level PACT—X2 signal, each of which signals requests the circuit not to activate XSPC network 31—X. Circuit 36—X responds to such requests by inhibiting action of the XSPC network by causing the PST—X signal input to the protection channel XSPC segment 31—XX to be at a O level. The enabling circuit 36—Y acts in a similar manner to inhibit operation of the YSPC network. That is, the appearance of a 1 level PACT—Y1 input and a O level PACT—Y2 input results in circuit 36—Y inhibiting action of the YSPC network by forcing the PST—Y signal applied to YSPC segment 31—YY to be at a O level.

The aforesaid failure of the enabling circuits to activate the XSPC network and YSPC network causes each of the signals EN—XA to EN—XF developed by the XSPC segments and each of the signals EN—YA to EN—YF developed by the YSPC segments to be at a O logic level. The aforesaid O logic level for each signal EN, in turn, disables its corresponding regular channel assignment and memory logic circuit and thus such condition must be changed if a switch is to be effected.

As mentioned above, each of the protection channel status circuits 35 in addition to receiving the signals PCCR and PCNR also receives a protection carrier pilot report signal PCPR signal from its associated monitor 21. A O logic level for the PCPR signal will be assumed herein to indicate presence of a pilot, while a 1 logic level will be assumed to indicate the absence thereof. Each protection channel status circuit, in turn, responds to its respective PCPR signal by developing a transmitter switch verification signal TVER which is a 1 when PCPR is a O and a O when PCPR is a 1. Under the present circumstances, where no switch is to be effected, the pilots on the X and Y protection channels are both present and thus the signals PCPR—X and PCPR—Y are at O logic levels, while the the signals TVER—X and TVER—Y are at 1 logic levels.

Having discussed the switching system operation for the case where none of the regular channels or protection channels has failed, let it now be assumed that the latter situation is altered so that the carrier on one of the regular channels, for example, the regular channel B, becomes unacceptable, thus indicating a failure of this channel. The aforesaid failure of the carrier on regular channel B will be monitored by monitor 21—B and, in response thereto, the monitor logic level of signal RCCR—B will be changed from O to 1. The aforesaid change in RCCR—B from O to 1 will appear at the input of status circuit 35—B where it will be recognized as indicating to the circuit that a switch of the service on channel B to the protection channel should be requested.

Status circuit 35—B thus responds to the change in the level of signal RCCR—B by changing the logic level of its output switch request signal SR—B from a 1 to a O. This logic level change of SR—B is fed to regular channel X and Y assignment and memory logic control circuits 34—XB and 34—YB which interpret it as a request to initiate execution of a switch of regular channel B to their respective X and Y protection channels. Which of the aforesaid assignment and memory circuits will, in fact, act upon the switch request being made by the signal SR—B will depend upon which of the SPC networks is activated. In the present situation, since the Y protection channel is available (i.e., is not in use or has not failed) and since, as above indicated, the regular channel B prefers to be switched to such protection channel, activation of the YSPC network will be initiated. Such initiation occurs by way of the status circuit 35—B changing the logic level of the output signal ECR—B from a 1 to a O, the aforesaid signal change occurring simultaneously with the change in the SR—B signal and in response to the O to 1 change of the RCCR—B signal.

The change of the ECR—B signal from a 1 to a O causes the signal PACT—Y1 on bus 39 to change from a 1 to a 0. This logic level change appears at the input of SPC enabling circuit 36—Y and is recognized by the latter circuit as a request to start YSPC network 31—Y. Since the Y protection channel has not failed, as evidenced by the 1 logic level of the PCF—Y signal, circuit 36—Y acts upon such request and starts YSPC network 31—Y by changing the logic level of its output PST—Y signal from a 0 to a 1.

More particularly, the appearance of a 1 level PST—Y signal at the input of YSPC segment 31—YY causes the YSPC network to operate with the result that segment 31—YY is caused to develop an output logic level which appears at the input to YSPC segment 31—YA and is interpreted by such segment as a direction to change the logic level of the output signal EN—YA from a 0 to a 1 for a brief duration of time *t*, while maintaining constant for such time the logic level of the output being fed to the next YSPC segment 34—YB. YSPC segment 31—YA thus changes the level of the EN—YA signal to a 1 thereby enabling the regular channel Y assignment and memory control circuit 34—YA so that it can now effect a switch, if the switch request signal SR—A is requesting a switch to be made. Since, however, the switch request signal SR—A at the input of circuit 34—YA is at a 1 level, indicating no switch is being requested, circuit 34—YA does not act and holds its output logic signals at the present levels.

As indicated above, the signal EN—YA remains at a 1 level for only a short duration of time *t* and thereafter returns to its O level condition, thereby again disabling control circuit 34—YA. Simultaneously with the return of the signal EN—YA to a O level, YSPC segment 31—YA develops a logic level on the output being fed to the input of the next successive segment 31—YB which causes the latter circuit to act in a manner analagous to that just exhibited by segment 31—YA. As a result, YSPC segment 31—YB responds to such signal by causing its output enabling signal EN—YB to change to a 1 level for a similar time *t*, while it holds its output being fed to the next YSPC segment 31—YC during this time at its present level. The change of EN—YB to a 1 enables the regular channel control circuit 34—YB, thereby allowing the latter circuit to effect a switch of its associated regular channel B to the Y protection channel, if a switch is being requested by signal SR—B. Since, in this case, SR—B is at a 0 level and thus requesting a switch to be made, the enabled control circuit 34—YB initiates or orders a switch of channel B to protection channel Y.

Such initiation or order results in control circuit 34—YB changing the logic level of the PSTP—YB output signal to a 0. The appearance of PSTP—YB signal at a 0 level directs the YSPC segment 31—YB to inhibit any further change in the EN—YB signal and, additionally, to inhibit any change in the signal level of the output signal being fed to the YSPC segment 31—YC of the next successive section. This action thus maintains the logic control circuit 34—YB enabled, while it additionally prevents any subsequent YSPC segment from changing its respective EN signal and thereby enabling its associated control circuit. No other control circuits can thus now effect a switch of their associated regular channels to the Y protection channel upon their SR signals subsequently requesting a switch.

Having thus stopped the YSPC network so that it remains enabled and so that no other Y assignment and memory circuits can become enabled, circuit 34—YB then proceeds in a conventional manner to generate signal changes which, when acted upon by itself and the other conventional portions of the switching system, result in effecting the ordered switch of channel B to protection channel Y. More particularly, the memory portion of the circuit, which controls the logic level of the receiver switch signal RSW—YB, is set so that, upon receipt of proper verification of a bridge of the regular channel B to the protection channel Y at the transmitter it can change the logic level of the signal RSW—YB to result in analagous switch at the receiver of the protection channel Y to regular channel B. The memory portion of circuit 34—YB having been set, the circuit then generates an order for the transmitter switch by changing the logic level of the transmitter switch order signal TSO—YB from a 1 to a 0.

This change in logic level of the signal TSO—YB is fed to the receiver signaling facility 24 which interprets it as a direction to send a switch B to Y order signal to the transmitting signaling facility 17. Facility 24 thus generates the aforesaid order signal and transmits it over the auxiliary facility 26. The order signal is subsequently received by signaling facility 17 and conveyed therefrom to transmitter switch control 16. Control 16 interprets the order signal as a switch of channel B to the protection Y and develops signals in response thereto which direct the transmitter switch 14 to switch or bridge the service on channel B to protection channel Y and simultaneously to disconnect the carrier and pilot supply 15 feeding this protection channel. Responding to these signals, the switch 16 performs the latter switching, thus completing the switch of channel B to protection channel Y at the transmitter terminal.

At the receiver terminal, the removal of the pilot signal from protection channel Y changes the level of the signal PCPR—Y developed by monitor 21—Y from a 0 to a 1 level. This change in signal is coupled to protection channel status circuit 35—Y which responds thereto by changing the level of the transmitter verification signal TVER—Y from a 1 to a 0.

The change of TVER—Y from a 1 to a 0 is fed to control circuit 34—YB and, in particular, to the memory portion thereof. The aforesaid memory portion of the control circuit recognizes the change in level of TVER—Y as the above-mentioned verification that the ordered bridge of channel B to protection channel Y at the transmitter has been effected. Control circuit 34—YB thus, in response to the verification signal, changes the logic level of the output receiver switch signal RSW—YB from a 1 to a 0. The change in logic level of RSW—YB is then fed to receiver switch 18 which acts in response thereto to disconnect channel Y from load 20 and to switch the service on channel Y to regular channel B. The aforesaid action of receiver switch 18 thus completes the regular to protection channel switching operation of the switching system resulting from the prior order by circuit 34—YB of apparatus 23 to switch the service on regular channel B to the protection channel Y.

At the same time circuit 34—YB is making the aforesaid order, however, it also functions to generate another order. This other order is directed toward operation of the XSPC network and results from changing the logic levels of the signals IB—XB and ACT—XB.

In particular, circuit 34—YB first changes the logic level of the signal IN—XB from a 1 to a 0. The 0 logic level IN—XB signal appears as an input to assignment and memory circuit 34—XB and acts to inhibit this circuit from ordering a further assignment of already assigned regular channel B, regardless of any other inputs to the circuit. As a result, circuit 34—XB will not order such an assignment when the subsequently activated XSPC network changes the logic level of the enabling signal EN—XB from a 0 to a 1.

Having inhibited assignment and memory circuit 34—XB, circuit 34—YB then changes the level of signal ACT—XB from a 1 to a 0. This change in signal appears at activating circuit 37—X and, as above-indicated, is interpreted by such circuit as a direction to request activation of XSPC network 31—X. In response to such direction, the logic level of the signal PACT—X2 developed by circuit 37—X is changed from a 0 to a 1. Enabling circuit 36—X recognizes the 1 level PACT—X2 signal as a request to activate XSPC network 31—X. Since the PCF—X signal into circuit 36—X is still at a 1 level, circuit 36—X responds to such request by activating the XSPC network via a change of the logic level of the PST—X signal from a 0 to a 1.

Once activated, the XSPC network functions in a similar manner as the previously discussed YSPC network. In particular, segment 31—XX of the XSPC network develops a logic level output which when coupled to the input of segment 31—XA causes the signal EN—XA developed by this segment to change to a 1 for a duration of time *t*. The 1 level EN—XA signal, in turn, enables the X assignment and memory circuit 31—XA, thereby permitting this circuit to assign the regular channel A to the protection channel X, if such assignment is being requested by the signal SR—A.

Since, in the present case, SR—A is not requesting a switch, no assignment is made. The signal EN—XA then returns to a 0 level and the output of segment 31—XA, feeding segment 31—XB, changes so as to cause the signal EN—XB of the latter circuit to change from a 0 to a 1 for a time *t*. Normally, since the signal SR—B is at a 0 level and thus requesting a switch, the 1 level EN—XB signal would enable circuit 34—XB, causing the latter circuit to assign regular channel B to the X protection channel. However, as discussed above, such assignment is prevented by the 0 logic level on inhibit signal IN—XB. No assignment being made, the signal EN—XB returns to a 0 level and the output of segment 31—XB, feeding segment 31—XC, changes so as to cause a similar functioning of the latter circuit. Subsequent XSPC segments will thus be similarly activated and, hence, the EN—X signals will continue to undergo short duration or pulse changes in sequence until another request to switch is made and acted upon and the XSPC network thereby stopped.

The above discussion has illustrated how the present automatic switching system operates when a regular channel fails. To present a complete description of the operation of the system, however, it is also necessary to examine such operation during the reverse situation, i.e., during the recovery of a priorly failed regular channel. Let it now be assumed, therefore, that our illustrative situation is further altered so that the carrier on channel B now returns to an acceptable level. Such a condition of the channel B carrier eliminates any further need for using the protection channel Y as a substitute for the regular channel B and as a result will cause the switching system to remove its priorly made substitution, the operation of the system in removing the substitution being essentially the reverse of the operation of the system in making the substitution.

More particularly, return of the carrier on channel B to an acceptable level causes channel monitor 21—B to change the level of its output signal RCCR—B from a 1 back to a 0. The 0 on signal RCCR—B appears at status circuit 35—B where it is recognized by the status circuit as indicating that an acceptable carrier level now exists on the regular channel B. The status circuit 35—B thus responds to the 0 RCCR—B signal by returning its switch request signal SR—B and its enabling circuit request signal ERC—B back to 1 level signals.

The 0 to 1 change in the signal level of the signal ECR—B appears on common bus 39 and forces the PACT—Y1 signal on the bus to also return to a 1 level. The aforesaid 1 level PACT—Y1 signal appears at the input of SPC enabling circuit 36—Y and, as above discussed, acts as a request not to activate YSPC network 31—Y. Since the PACT—Y2 signal is at a 1 level and thus making a similar request of no activation and, moreover, since the PCF—Y signal is still at a 1 level indicating no failure of the Y protection channel, enabling circuit 36—Y responds to the aforesaid request being made by 1 level PACT—Y1 signal by deactivating the YSPC network. It does so by changing its PST—Y1 signal being fed to YSPC segment 31—YY to a 0 level. The YSPC 31—Y network thus, after the PSTP—YB signal is caused by the 0 SR—B signal to return to a no stop condition, ceases to be activated, thereby returning the enabling signals EN—YA to EN—YF to their prior 0 levels which in turn results in disabling the Y assignment and memory circuits 34—YA to 34—YF.

The 0 to 1 change in the signal level of the signal SR—B, on the other hand, appears at the Y assignment and memory circuit 34—YB indicating to that circuit that a switch of regular channel B is no longer being requested. In response to such signal, circuit 34—YB thus changes the signal levels of its output signals PSTP—YB, ACT—YB, TSO—YB and RSW—YB. More particularly, the PSTP—YB signal is changed by the circuit back to a 0 level which, as indicated above, is indicative of a no stop condition to its associated YSPC segment 31—YB.

The ACT—XB signal, moreover, is also changed by circuit 34—YB back to its prior signal level, i.e., a 1. This change in signal causes activating circuit 37—X to force the signal PACT—X2 back to a 0. The 0 level PACT—X2 signal, in turn, acts as a request to enabling circuit 36—X not to activate XSPC network 31—X. Since the signal PCF—X is still at a 1 level indicating no failure of the X protection channel and since the PACT—X1 signal is making a similar request of no activation, circuit 36—X responds to the 1 level PACT—X2 signal by deactivating XPSP network 31—X. It does so by changing the PST—X signal fed to XSPC segment 31—XX from a 1 to a 0. The XSPC network thus ceases to be activated resulting in the enabling signals EN—XA to EN—XF returning to 0 levels and thus in the X assignment and memory circuits 34—X becoming disabled.

As above-indicated, the 1 level SR—B signal causes circuit 34—YB to also change the signal levels of the signals RSW—YB and TSO—TB. More specifically, in response to the 1 level SR—B signal the memory portion of circuit 34—YB is reset, thereby changing the receiver switch signal RSW—YB back to a 0. The 0 RSW—YB signal is received by receiver switch 18 which interprets it as an order to remove the switch of the Y protection channel to the regular channel B. Receiver switch 18 responds to such order by disconnecting channel Y from the regular channel B and at the same time reconnecting the protecting channel Y to load 20.

Simultaneously with resetting its memory portion, circuit 34—YB also changes the level of the transmitter switch order signal TSO—YB from a 1 back to a 0. The 0 TSO—YB signal appears at the receiver signal facility 24 where it is recognized as a direction to discontinue sending the switch Y to B order signal. The discontinuance of the order signal by signalling facility 24 is conveyed to transmitter switch control 16 via signalling facility 17. The latter switch control recognizes such discontinuance as an order to remove its bridge of regular channel B to the protection channel Y. Switch control 16 responds to such order by disconnecting the Y protection channel from regular channel B and reconnecting the protection channel to the generator 15. This action of switch control 16 thus completes the removal of the priorly made substitution of the Y protection channel for the regular channel B.

Since, however, reconnecting of generator 15 to the protection channel restores the pilot signal to the channel, such reconnection results in a further signal change which occurs at the receiver. In particular, channel monitor 21—Y detects the presence of the pilot signal and communicates such presence to status circuit 35—Y by changing the level of the signal PCPR from a 1 to a 0. In turn, status circuit 35—Y responds to such change in the signal PCPR by changing the signal TVER—Y from a 0 back to a 1. With the aforesaid change in the signal TVER—Y, the switching system has now returned to its no channel failed condition and will remain so until another channel fails.

The above situations have illustrated operation of the automatic switching system, and, in particular, apparatus 23 for the specific cases of no regular channels being failed and one regular channel being failed. All other cases which might be set forth to further illustrate such operation, however, are, for the most part, obvious and straight-forward extensions of the aforesaid two cases. It is apparent therefore that a discussion of such cases would add nothing significant to what has already been discussed, and, as a result, such discussion is believed unnecessary and hence has not been included.

Having discussed the overall operation of the present invention, attention is directed to FIG. 3 which shows one embodiment of a circuit arrangement which can be employed as either XSPC network 31—X or YSPC network 31—Y of apparatus 23. As illustrated, however, the circuit arrangement is assumed to comprise the YSPC network 31—Y.

More specifically, as shown in FIG. 3, each of the regular channel YSPC segments 31—YA to 31—YF includes an identical arrangement of conventional binary element NAND gates. In particular, each of the segments includes a first pair of serially connected NAND gates 41 and 42 and a second pair of serially connected NAND gates 43 and 44, the latter pair of gates being connected in parallel with gate 41 of the first pair of gates. Thus, as shown, YSPC segment 31—YA comprises series connected gates 43—A and 44—A which are connected in parallel with gate 41—A of series connected gates 41—A and 42—A, YSPC segment 31—YB comprises series connected gates 43—B and 44—B which are connected in parallel with gate 41—B of series connected gates 41—B and 42—B, etc.

Each of the NAND gates 41 of segments 31—YA to 31—YF receives two logical inputs, one from the output gate of a prior YSPC segment and the other a PSTP—Y signal from the control circuit 34—Y associated with particular YSPC segment. Additionally, each of the gates 41 has associated with it a delay mechanism which delays the gate output from changing from a 1 to 0 for a time *t* when the input to the gate from the prior segment changes from 0 to 1. Such delay is provided to the gates 41—A to 41—F by the capacitive elements 45—A to 45—F, respectively, which are connected between the gate expander input and ground.

The output of each gate 41 serves as the only input to its series connected member 42. The output of gate 42, in turn, serves as one of the inputs to the next subsequent YSPC segment.

As above-indicated, each of the gates 43 is connected in parallel with its respective gate 41. Thus, each of the gates 43 also receives two logical inputs, one being the logical input to its associated gate 41 and the other being the logical output of the aforesaid gate. The output of each gate 43, in turn, serves as the sole input to its series connected member 44, which member responds thereto by developing the enabling signal EN.

The protection channel YSPC segment 31—YY includes a different arrangement of NAND gates than does the regular channel SPC segments. In particular, segment 31—YY includes three serially connected NAND gates 46, 47 and 48. The latter gates are provided with delay means in the form of capacitors 49, 50 and 51. The aforesaid capacitors operate to delay an output change of their respective gates from 1 to a 0 in a similar manner as capacitors 45.

NAND gate 46 of segment 31—YY is the gate which receives the YSPC network start signal PST—Y from YSPC enabling circuit 36—Y. In addition, gate 46 also receives the output from gate 42—F of regular channel segment 31—YF. The output of gate 46, in turn, serves as the input to gate 47 whose output serves as the input to gate 48, the output of the latter gate, in turn, serving as an input to gate 41—A of YSPC segment 31—YA. The gates 46, 47 and 48 and the gates 41 and 42 of the YSPC segments are thus serially connected in a closed loop 33—Y to form a ring counter type arrangement.

In order to illustrate the operation of YSPC 31—Y as embodied in FIG. 3, changes occurring in the logic levels at the input and output of each of the gates will be examined for the above-discussed situation of the failure of regular channel B. At the outset, prior to failure of any channel, the logical inputs and outputs of the gates and logical levels of signals PSTP—Y, EN—Y and PST—Y are as shown in the Figure. In this situation, the YSPC is stopped and the signals EN—YA to EN—YF are all at a 0 logic level, thereby disabling their respective control circuits 34—Y.

Upon the failure of channel B, the PST—Y signal is changed from a 0 to a 1. The output of gate 46 thus goes to 0, after a delay, due to the presence of a capacitor 49. The 0 from gate 46 is coupled to the input of gate 47, making its output go immediately to 1, since the capacitor 50 has no effect during a 1 to 0 input change. The 1 output of gate 47 then appears at the input of gate 48, thereby forcing the output of the latter gate to 0, after a delay due to the presence of capacitor 51.

The 0 output of gate 48 is then coupled to its respective input to gate 41—A, resulting in an immediate 1 output of that gate. Since the inputs to gate 43—A are thus immediately changed from 0 and 1 to 1 and 0, the output of gate 43—A remains unchanged at 1, thus retaining the output of gate 44—A at 0.

The 1 output of gate 41—A also appears at gate 42—A changing the output of gate 42—A and thus the input to gate 41—B to 0. The 0 input to gate 41—B of segment 31—B represents the same situation as that which occurred when the input to gate 41—A of segment 31—YA went to 0. In response thereto, the logical levels of the gates of segment 31—YB thus change in a similar manner as those of the gates of segment 31—YA. Likewise, the logical levels of the gates of the subsequent segments 31—YC to 31—YF also change in this manner. During this first rapid pass through YSPC network 31—Y, therefore, the outputs EN—YA to EN—YF remain unchanged and no enabling of circuits 34—Y is thus realized.

However, the output of gate 42—F of segment 31—YF is now at 0. This 0 output is coupled to the other input of gate 46 of segment 31—YY. The latter 0 input and the PST—Y input to the gate which is still at a 1 level change the output of gate 46 back to a 1. The 1 output of gate 46 is then fed to the input of gate 47 changing the latter gate's output to 0, after a delay due to capacitor 50. The 0 output of gate 47 then appears at the input of gates 48 changing the output of that gate to a 1.

The 1 output of gate 48 is then coupled to the input of gate 41—A. Due to capacitor 45—A, however, the output of gate 41—A does not change immediately upon receiving this input but remains at its 1 level for a short delay of time *t*. During this period, therefore, both inputs to gate 43—A are at a level, thereby forcing the gate output to a 0. The 0 output of gate 43—A is coupled to the input of gate 44—A. This latter 0 input thus causes the output EN—YA of this gate to go to 1 which, as discussed above, causes logic circuit 34—YA to be enabled.

After the time *t* has elapsed, however, the output of gate 41—A goes to 0. The inputs to gates 43—A are thus changed from a 1 and 1 to a 1 and 0. The output of gate 43—A responds to this change by going to a 1. The 1 output at gate 43—A then forces the output EN—YA of gate 44—A back to 0, thus again disabling the control circuit 34—YA. The YSPC segment 31—YA has thus enabled the control circuit 34—YA for a duration of time *t* via an enabling pulse signal on EN—YA of the same duration.

The 0 output now appearing on gate 41—A is coupled to the input of gate 41—A forcing the output of the latter gate to 1. This output is then coupled to the input of gate 41—B of YSPC segment 31—YB. The signal levels on the gates of YSPC segment 31—YB are thus the same as those that were on the gates of segment 31—YA when its input from YSPC segment 31—YY was changed to a 1. YSPC segment 31—YB thus reacts in a similar manner. In particular, the output of gate 41—B does not respond immediately to the 1 input, but the output of gate 41—B remains at a 1 level for a time *t*. This causes the input of gate 43—B to be a 1 and 1 which changes the output of this gate to a 0. The aforesaid 0 output is then coupled to the input of gate 44—B whose output EN—YB is thereby changed to a 1, resulting in the enabling of logic circuit 34—YB.

If for the moment, it is assumed that channel B had not failed, then the 1 output level for EN—YB would remain for a time *t* and then go to 0 as a result of the output of gate 41—B going to 0. The 0 on gate 41—B would then also force the output of gate 42—B to a 1. The latter output would be coupled to gate 41—C of the next successive YSPC segment and this YSPC segment would react in a similar manner as the two prior segments as would all subsequent segments. Thus, it is observed that YSPC network 31—Y as embodied in FIG. 3, causes a short duration enabling signal or pulse to circulate in sequence from segment to segment, whereby the logic circuits 34—YA to 34—YF are sequentially enabled so as to be able to provide switching action of their corresponding regular channels to the Y protection channel.

Since channel B has failed, however, when circuit 34—YB is enabled by the 1 signal on EN—YB, the circuit makes ann assignment of channel B to the protection channel. Such assignment results in changing the logic level of PSTP—YB to a 0. As a result, the logic level at the output of gate 41—B instead of going to a 0 is held at a 1. Gate 43—B thus remains with the same inputs 1 and 1 after the time *t* has elapsed as it had during such time. Hence, its output also remains the same thus forcing output EN—YB of gate 44—B to remain at its 1 level. The continued 1 level or EN—YB signal thus maintains the circuit 34—YB in an enabled condition.

The 1 output on gate 41—B, being unchanged, causes the output of gate 42—B to remain unchanged at 0. Since the latter output serves as the input to the next successive YSPC segment this segment sees no input change and thus the logic levels of its gates remained unchanged. A similar result follows in the case of the logic levels of the gates of all subsequent segments. The signals EN—YA and EN—YC to EN—YF are thus now held at a 0 level, thereby preventing their associated circuits 34—Y from being enabled.

The result of the PSTP—YB signal going to a 0 level is thus to stop the YSPC network 31—Y from providing an enabling signal to logic circuits 34—Y other than circuit 34—YB. As a result, no other channels can be switched to the Y protection channel as long as channel B remains so switched.

Having discussed in detail a particular logic circuit arrangement which can be employed to perform the functions of either the XSPC network 31—X or the YSPC network 31—Y of FIG. 2, it should be pointed out that the functions to be performed by the other elements of FIG. 2 can be performed either by wellknown prior art logic circuit arrangements or by logic circuit arrangements straightforwardly derivable from prior art logic circuit design techniques. In particular, such prior art logic circuits and prior art design techniques are disclosed in a variety of prior art text books, two of which are the following: *The Logic Design of Transistor Digital Computers*, Gerald E. Maley and John Earle, 1963, Prentice Hall and *Switching Circuits for Engineers*, Mitchell P. Marcus, 1967, Prentice Hall.

Figure 4:
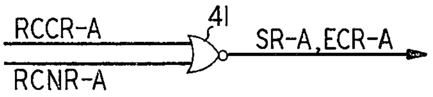
FIGS. 4 and 5 illustrate typical logic circuit arrangements which can be employed to perform the functions of the status circuits and activating circuits, respectively, of the control apparatus of FIGS. 2A and 2B.
Figure 5:
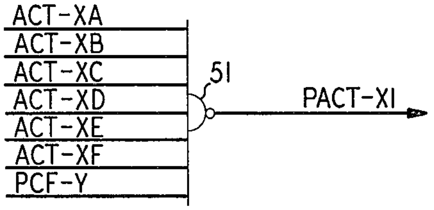
Figure 6:
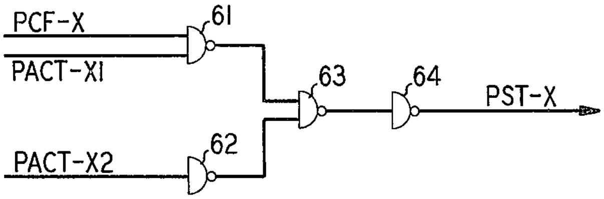
FIG. 6 shows a typical logic circuit arrangement which can be employed for the sequential pulsing circuit enabling circuits of the control apparatus of FIGS. 2A and 2B.
Figure 7:
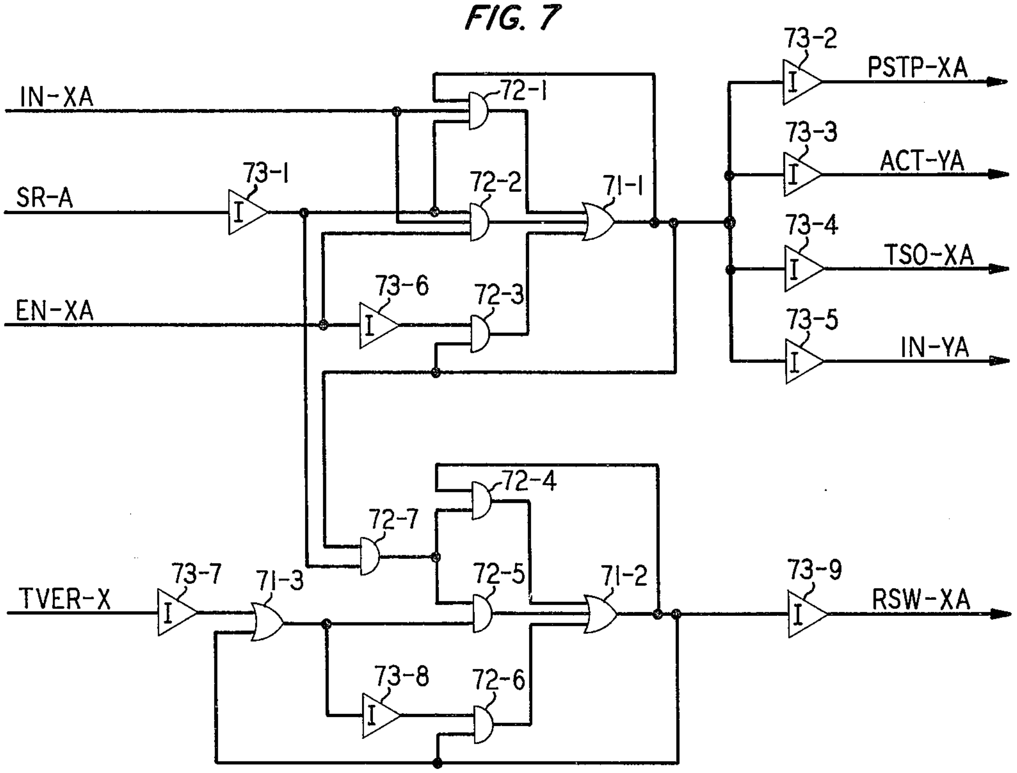
FIG. 7 illustrates a typical sequential logic circuit configuration which can perform the sequential functions of the assignment and memory logic circuits of the control apparatus of FIGS. 2A and 2B.

More specifically, FIGS. 4 and 5 illustrate, respectively, prior art NOR and NAND logic circuit arrangements which are shown in FIGS. 3—6 and 3—5, respectively, on page 38 of the aforementioned Marcus text and which can be employed for the status circuits 35 and the activating circuits 37, respectively, of FIG. 3. As shown, the NOR logic circuit 41 of FIG. 4 has been illustrated with input and output signals corresponding to those of status circuit 35—A and the NAND logic circuit 51 of FIG. 5 with input and output signals corresponding to those of activating circuit 37—X. FIG. 6, on the other hand, illustrates a prior art logic circuit arrangement which can be employed for the SPC enabling circuits of FIG. 3. The aforesaid circuit arrangement comprises a combination of NAND logic circuits 61, 62, 63 and 64 appears as circuit 12 on page 309 of the above-mentioned Maley and Earle Text. As illustrated in FIG. 6, the circuit has input and output signals corresponding to those of the SPC enabling circuit 36—X. Finally, in FIG. 7, a sequential logic circuit arrangement is shown which can perform the sequential functions described hereinabove for the assignment and memory logic circuits of FIG. 3. The aforesaid sequential circuit can be derived in a straightforward manner by following the prior art synthesis procedure which is outlined on pages 193 and 194 and explained in detail in Chapters 14–17 of the abovementioned prior art Marcus text. As illustrated, the circuit comprises a combination of conventional OR logic circuits (71—1 to 71—3), AND logic circuits (72—1 to 72—7) and INVERTER logic circuits (73—1 to 73—9) and has input and output signals corresponding to assignment and memory circuit 34—XA.

As is apparent from the above apparatus 23 of the present switching system has been arranged on a per channel basis so that each of its sections includes apparatus necessary to effect switching of only its own channel. As a result of such an arrangement of the sections of apparatus 23 and of the use therein of SPC networks which provide enabling and inhibiting functions for the sections, while introducing only a limited number of interconnections therebetween, it is possible to easily and inexpensively add additional sections to apparatus 23 to accommodate additional channels. More particularly, an additional regular channel section can be incorporated into apparatus 23 of FIG. 2 merely by opening the loops 33—X and 33—Y and appropriately inserting in series therein the X and Y SPC segments respectively, included in the section. The only other connections which would have to be made are as follows:

connection of the status circuit to its appropriate bus 38 or 39; connection of the assignment circuits to their associated activating circuits; connection of the assignment circuits to the signaling facility; and connection of assignment circuits to their respective X or Y verification signal line.

In all cases, it is understood that the abovedescribed arrangements are simply illustrative of some of the many possible specific embodiments which represent applications of the present invention. Numerous and varied other arrangements can readily be devised without departing from the spirit and scope of the invention.

What is claimed is:

1. Apparatus for initiating the substitution of a protection channel for any one of a plurality of regular channels comprising:

a protection network including a plurality of channel associated circuit segments each of which is associated with a different channel, said segments being connected in series and providing a means for transmitting an enabling signal from segment to segment;

and control means responsive to said enabling signal for initiating the substitution of said protection channel for a failed regular channel.

2. Apparatus in accordance with claim 1 in which said circuit segments form a closed loop.

3. Transmission terminal apparatus responsive to a plurality of regular channels and to a first protection channel comprising:

a first protection network including a plurality of first channel associated circuit segments each of which is associated with a different channel, said segments being connected in series to form a first closed loop and providing a means for circulating an enabling signal around said first loop from segment to segment;

means for enabling said protection network in response to the failure of a regular channel, the enabling of said protection network resulting in initiating the circulation of said enabling signal;

and control means responsive to said regular channel failure for initiating the substitution of said first protection channel for said failed regular channel when an enabling signal is present within the circuit segment associated with said failed regular channel.

4. Apparatus in accordance with claim 3 in which each of said first circuit segments associated with said regular channels includes means responsive to said control means for stopping said enabling signal from circulating to subsequent circuit segments upon initiation of the substitution of said protection channel for the regular channel associated with the segment.

5. Apparatus in accordance with claim 3 further including means responsive to the failure of said protection channel for disabling said enabling means.

6. Apparatus in accordance with claim 3 which is responsive to a second protection channel and which further includes a second protection network associated with said second protection channel, said second protection network including a plurality of second channel associated circuit segments each of which is associated with a different channel, said segments being connected in series to form a second closed loop and providing a means for transmitting an enabling signal around said second loop from segment to segment, and means for enabling said second protection network when the enabling signal generated by said first protection network is stopped from circulating.

7. Apparatus in accordance with claim 6 in which said means for enabling said second protection network initiates the circulation of an enabling signal within said second network.

8. Apparatus in accordance with claim 7 in which said control means acts to initiate substitution of said first protection channel for a failed regular channel in response to the presence of an enabling signal within the first circuit segment associated with the failed regular channel and in which said control means acts to initiate substitution of said second protection channel for a failed regular channel in response to the presence of an enabling signal within the second circuit segment associated with the failed regular channel.

9. Apparatus in accordance with claim 7 in which said control means includes inhibiting means for preventing the substitution of said second protection channel for a particular failed regular channel from being initiated once substitution of said first protection channel for said particular regular channel has been initiated.

10. Automatic switching system apparatus responsive to a plurality of regular channels and to a first protection channel, said regular channels and said first protection channel linking a transmitter terminal and a receiver terminal of a communications system, including:

detecting means for reporting the failure of any one of said channels;

a first sequential pulsing circuit comprising a first plurality of first sequential pulsing circuit segments which are serially connected to form a first closed loop, said first circuit segments providing a means for sequentially circulating a first enabling pulse from segment to segment around said first loop upon said first sequential pulsing circuit being started;

a first protection channel section associated with said first protection channel comprising one of said first segments and a first activation means for causing said first segment included in the section to start said first sequential pulsing circuit in response to reports from said detecting means of the failure of any one of a first group of selected ones of said regular channels;

a plurality of regular channel sections each associated with a different one of said regular channels, each of said sections including a different one of said first segments and a first assignment means for assigning the regular channel associated with the section to said first protection channel in response to reports from said detecting means of the failure of said associated regular channel and to the presence of said first enabling pulse within said first segment included in the section;

and means responsive to the first assignment means of each of said regular channel sections for initiating the substitution of said first protection channel for the particular regular channel which has been assigned to said first protection channel.

11. Apparatus in accordance with claim 10 in which the first segment of each of said regular channel sections includes means for stopping said first enabling pulse from circulating around said first loop in response to an assignment by the first assignment means included in the section of the regular channel associated with the section to said first protection channel.

12. Apparatus in accordance with claim 10 in which said first protection channel section includes means responsive to reports from said detecting means of the failure of said first protection channel for preventing said first segment included in said first protection channel section from starting said first sequential pulsing circuit.

13. Apparatus in accordance with claim 10 which is responsive to a second protection channel, said second protection channel also linking said terminals, and which includes:

a second sequential pulsing circuit comprising a second plurality of second sequential pulsing circuit segments which are serially connected to form a second closed loop, said second segments providing a means for circulating a second enabling pulse from segment to segment around said second loop upon said second sequential pulsing circuit being started;

a second protection channel section associated with said second protection channel including one of said second segments and a second activation means for causing said second segment included in said section to start said second sequential pulsing circuit in response to reports from said detecting means of the failure of any one of a second group of selected ones of said regular channels;

and in which each of said regular channel sections includes:

a different one of said second segments and a second assignment means for assigning the regular channel associated with the section to said second protection channel in response to reports from said detecting means of a failure of said associated regular channel and to the presence of said second enabling pulse within said second segment included in the section;

and in which said means for initiating is responsive to the second assignment means of each of said regular channel sections and acts to initiate the substitution of said second protection channel for the regular channel which has been assigned to said second protection channel.

14. Apparatus in accordance with claim 13 in which said first protection channel section includes means for causing said second activation means to start said second sequential pulsing circuit in response to an assignment being made by any one of said first assignment means and in which said second protection channel includes means for causing said first activation means to start said first sequential pulsing circuit in response to an assignment being made by anyone of said second assignment means.

15. Apparatus in accordance with claim 14 in which said first group of regular channels is different from said second group of regular channels.

16. Apparatus in accordance with claim 10 in which:

said first segment included in said protection channel section comprises a series connection of first, second and third logic circuits;

and the first segment included in each regular channel section comprises fourth and fifth serially connected logic circuits and sixth and seventh serially connected logic circuits, said series connection of sixth and seventh logic circuits being connected in parallel with said fourth logic circuit.

17. Apparatus in accordance with claim 16 in which:

said first logic circuit is connected to the input of said second logic circuit and said second logic circuit is connected to the input of said third logic circuit;

the output of said fifth logic circuit of the segment of said first loop immediately preceding the segment included in the first protection channel section is connected to the input of said first logic circuit and the output of the third logic circuit is connected to the input of the fourth logic circuit of the segment of said first loop immediately following said segment included in the first protection channel section;

and the output of the fifth logic circuit of each of the other segments of said first loop is connected to the input of the fourth logic circuit of the immediately following segment of said first loop.

18. Apparatus in accordance with claim 17 in which said first logic circuit is responsive to said first activation means and causes said first sequential pulsing circuit to start and in which said started first sequential pulsing circuit causes said first enabling pulse to appear sequentially at the outputs of said seventh logic circuits.

19. Apparatus in accordance with claim 17 in which each of said first, second, third, fourth, fifth, sixth and seventh logic circuits is a NAND gate.

20. Apparatus in accordance with claim 3 which both receives and transmits transmission channels.

21. Apparatus in accordance with claim 10 which includes means responsive to said initiating means for performing the substitution initiated thereby.

22. In a communications system comprising a transmitter terminal, a receiver terminal, a plurality of regular channels linking said terminals, a protection channel also linking said terminals and means for substituting said protection for any one of said regular channels, a protection network for enabling said substitution means, said protection network including a plurality of channel associated circuit segments each of which is associated with a different channel, said segments being connected in series and providing a means for transmitting an enabling signal from segment to segment, and control means responsive to said enabling signal for initiating operation of said substitution means to substitute said protection channel for a failed regular channel.

* * * * *

UNITED STATES PATENT OFFICE
CERTIFICATE OF CORRECTION

PATENT NO. : 3,878,463

DATED : April 15, 1975

INVENTOR(S) : Frederick H. Lanigan

It is certified that error appears in the above-identified patent and that said Letters Patent are hereby corrected as shown below:

Column 3, line 9, after "of", second occurrence, insert --the--. Column 7, line 8, "chanel" should read --channel--; line 39, after "enabling" delete "to". Column 11, line 29, after "logic" insert --level--. Column 15, line 16, "IB" should read --IN--. Column 17, line 16, "TB" should read --YB--. Column 19, line 58, after "a" insert --1--. Column 20, line 8, "41" should read --42--; line 43, "ann" should read --an--.

Signed and Sealed this

*eleventh* Day of *November 1975*

[SEAL]

*Attest:*

RUTH C. MASON
*Attesting Officer*

C. MARSHALL DANN
*Commissioner of Patents and Trademarks*